(12) United States Patent
Nini

(10) Patent No.: US 8,517,229 B2
(45) Date of Patent: Aug. 27, 2013

(54) TAP WITH INTEGRAL AIR VENT FOR DELIVERING LIQUIDS FROM VESSELS

(75) Inventor: Diego Nini, Alessandria (IT)

(73) Assignee: Vitop Moulding S.R.L., Alessandria (IT)

( * ) Notice: Subject to any disclaimer, the term of this patent is extended or adjusted under 35 U.S.C. 154(b) by 219 days.

(21) Appl. No.: 13/121,379

(22) PCT Filed: Sep. 17, 2009

(86) PCT No.: PCT/IT2009/000416
§ 371 (c)(1),
(2), (4) Date: Mar. 28, 2011

(87) PCT Pub. No.: WO2010/041286
PCT Pub. Date: Apr. 15, 2010

(65) Prior Publication Data
US 2011/0174842 A1    Jul. 21, 2011

(30) Foreign Application Priority Data

Oct. 9, 2008  (IT) .............................. TO2008A0740
Jan. 9, 2009  (IT) .............................. TO2009A0009

(51) Int. Cl.
*B67D 3/00*    (2006.01)

(52) U.S. Cl.
USPC ........................... 222/488; 222/518; 137/588

(58) Field of Classification Search
USPC ...... 137/588, 589; 251/318, 335.2; 222/212, 222/213, 479, 481, 484, 488, 505, 509, 511, 222/513, 514, 518, 559
See application file for complete search history.

(56) References Cited

U.S. PATENT DOCUMENTS

| | | | | |
|---|---|---|---|---|
| 3,187,965 A | * | 6/1965 | Bourget | 222/518 |
| 3,356,267 A | * | 12/1967 | Scholle | 222/213 |
| 3,595,445 A | | 7/1971 | Buford | |
| 3,601,287 A | * | 8/1971 | Schwartzman | 222/146.2 |
| 3,717,289 A | * | 2/1973 | Laurizio | 222/481 |
| 4,340,157 A | * | 7/1982 | Darner | 222/211 |
| 4,640,493 A | | 2/1987 | Dudzik | |
| 5,002,209 A | * | 3/1991 | Goodall | 222/479 |
| 5,400,840 A | * | 3/1995 | Flaherty | 141/384 |

(Continued)

FOREIGN PATENT DOCUMENTS
EP    1652813 A1    3/2006

OTHER PUBLICATIONS

Vitop Moulding S.R.L., International Search Report dated Apr. 14, 2010 issued in parent International Patent Application No. PCT/IT2009/000416.

*Primary Examiner* — Kevin P Shaver
*Assistant Examiner* — Patrick M Buechner
(74) *Attorney, Agent, or Firm* — David A. Farah; Sheldon Mak & Anderson PC

(57) ABSTRACT

A delivering tap (1), for delivering liquids from a container, comprising at least one body (3) made in a single piece and integral with at least one elastic, flexible thrusting pushbutton (17) and at least one flexible sealing lip (25), and at least one valve member (5) with integrated spring inside the body (3), the body (3) comprising at least one head (11) equipped with at least one delivering beak (12) for delivering liquids, the delivering beak (12) communicating with one and only one internal chamber (13) of the body (3) into which, during the delivery of liquid, a lower space for passing liquid (L) and an upper space for passing air (A) are naturally defined.

12 Claims, 13 Drawing Sheets

(56) References Cited

U.S. PATENT DOCUMENTS

| | | | |
|---|---|---|---|
| 5,799,839 A | 9/1998 | Moran et al. | |
| 6,360,925 B2 * | 3/2002 | Erb | 222/509 |
| 6,491,189 B2 * | 12/2002 | Friedman | 222/518 |
| D553,982 S * | 10/2007 | Erb | D9/447 |
| 7,455,281 B2 * | 11/2008 | Craft | 251/335.2 |
| 7,513,395 B2 * | 4/2009 | Labinski et al. | 222/481.5 |
| 7,543,723 B2 * | 6/2009 | Wilford et al. | 222/484 |
| 7,726,525 B2 * | 6/2010 | Nini | 222/511 |
| 2002/0030063 A1 * | 3/2002 | Leray et al. | 222/129 |
| 2002/0079001 A1 * | 6/2002 | Blackbourn et al. | 137/588 |
| 2007/0075101 A1 * | 4/2007 | Von Essen et al. | 222/505 |
| 2007/0290010 A1 * | 12/2007 | Nini | 222/511 |
| 2011/0017782 A1 * | 1/2011 | Nini | 222/518 |
| 2012/0111901 A1 * | 5/2012 | Beard et al. | 222/511 |

* cited by examiner

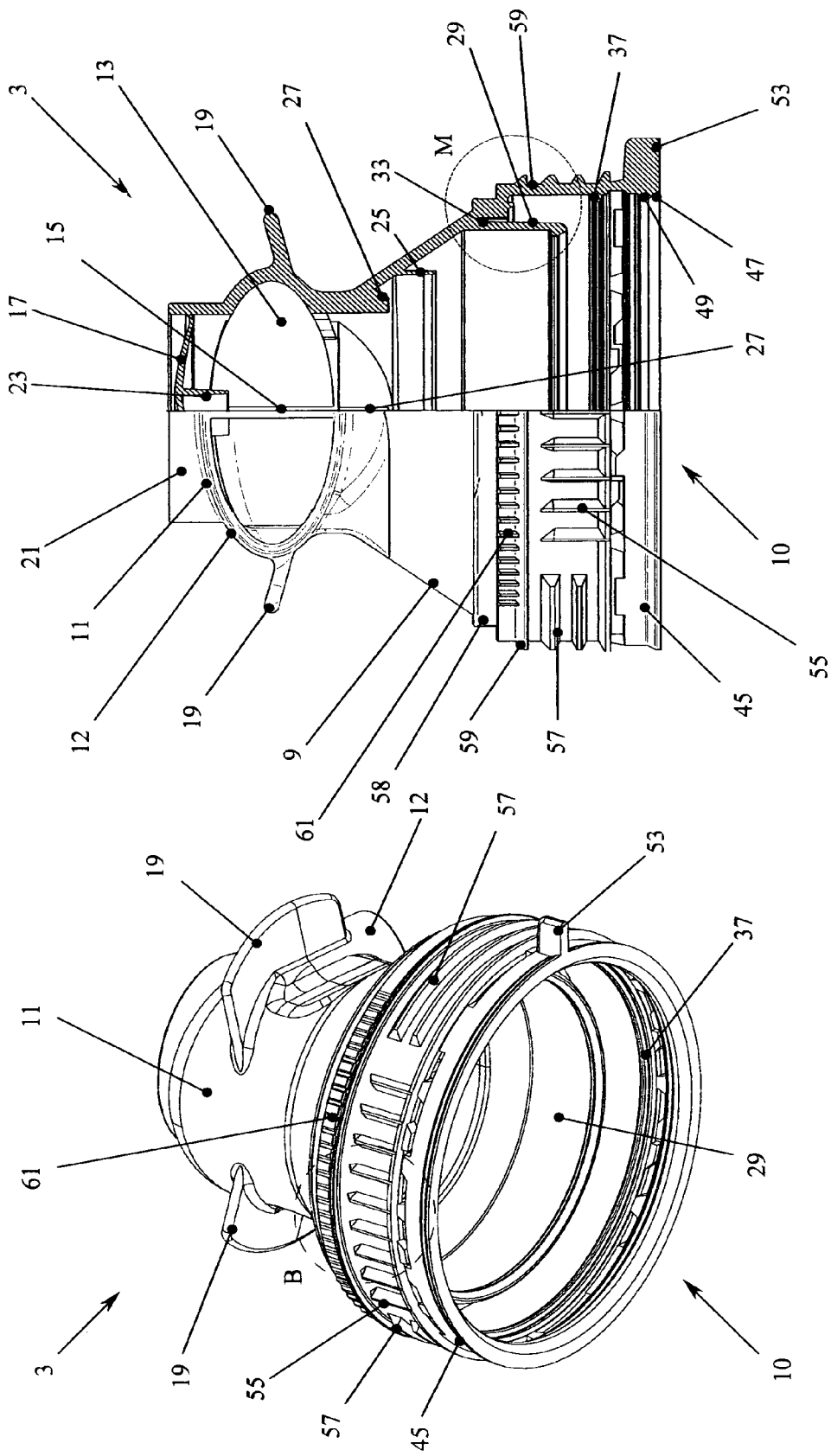

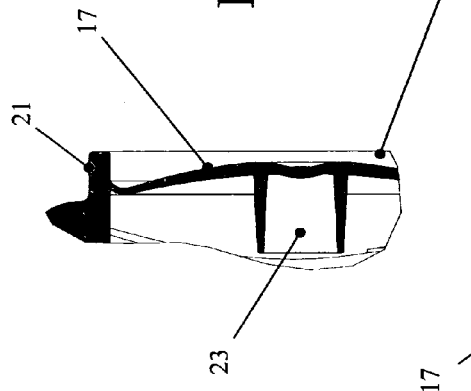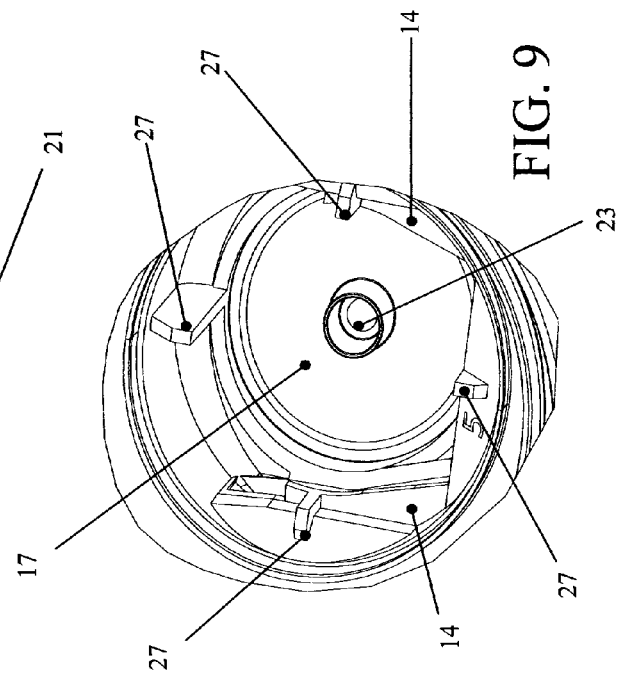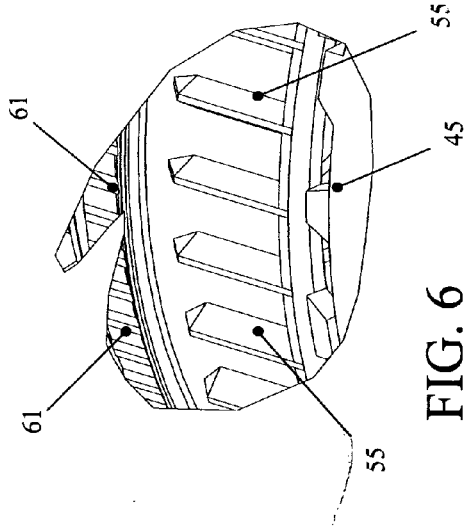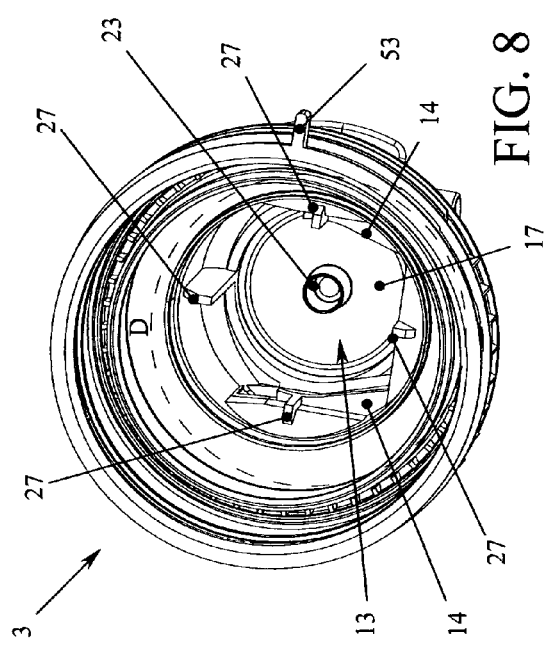

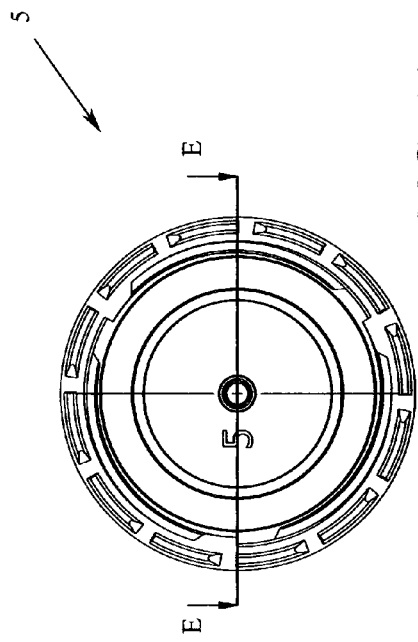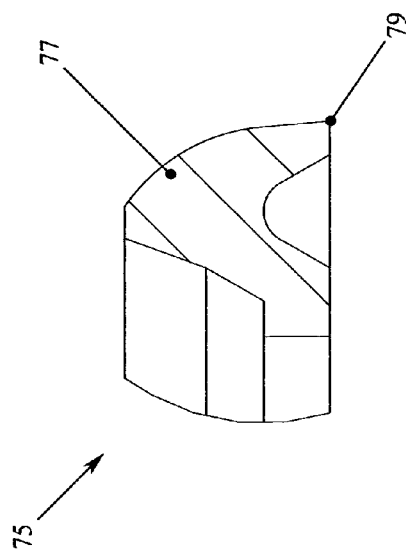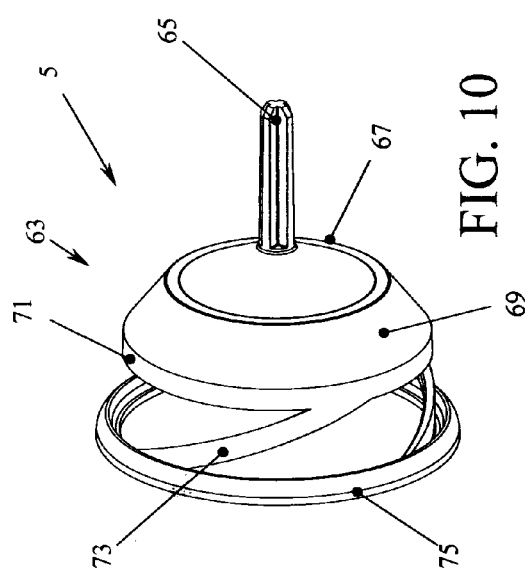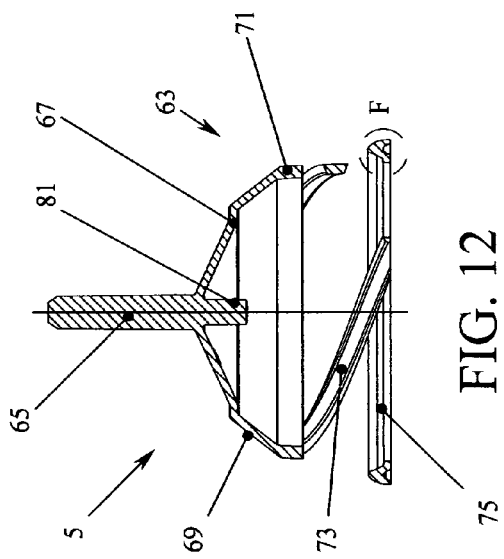

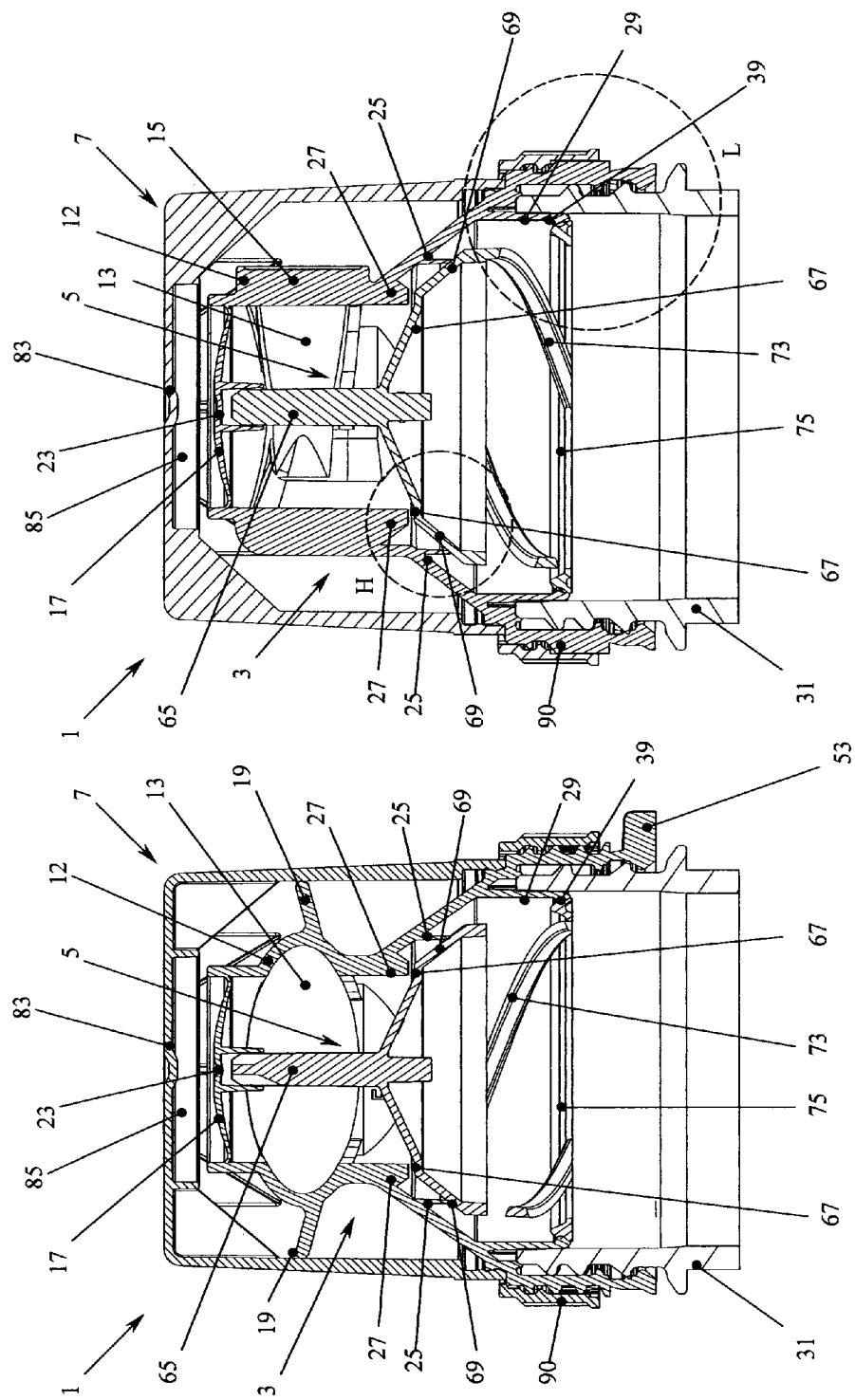

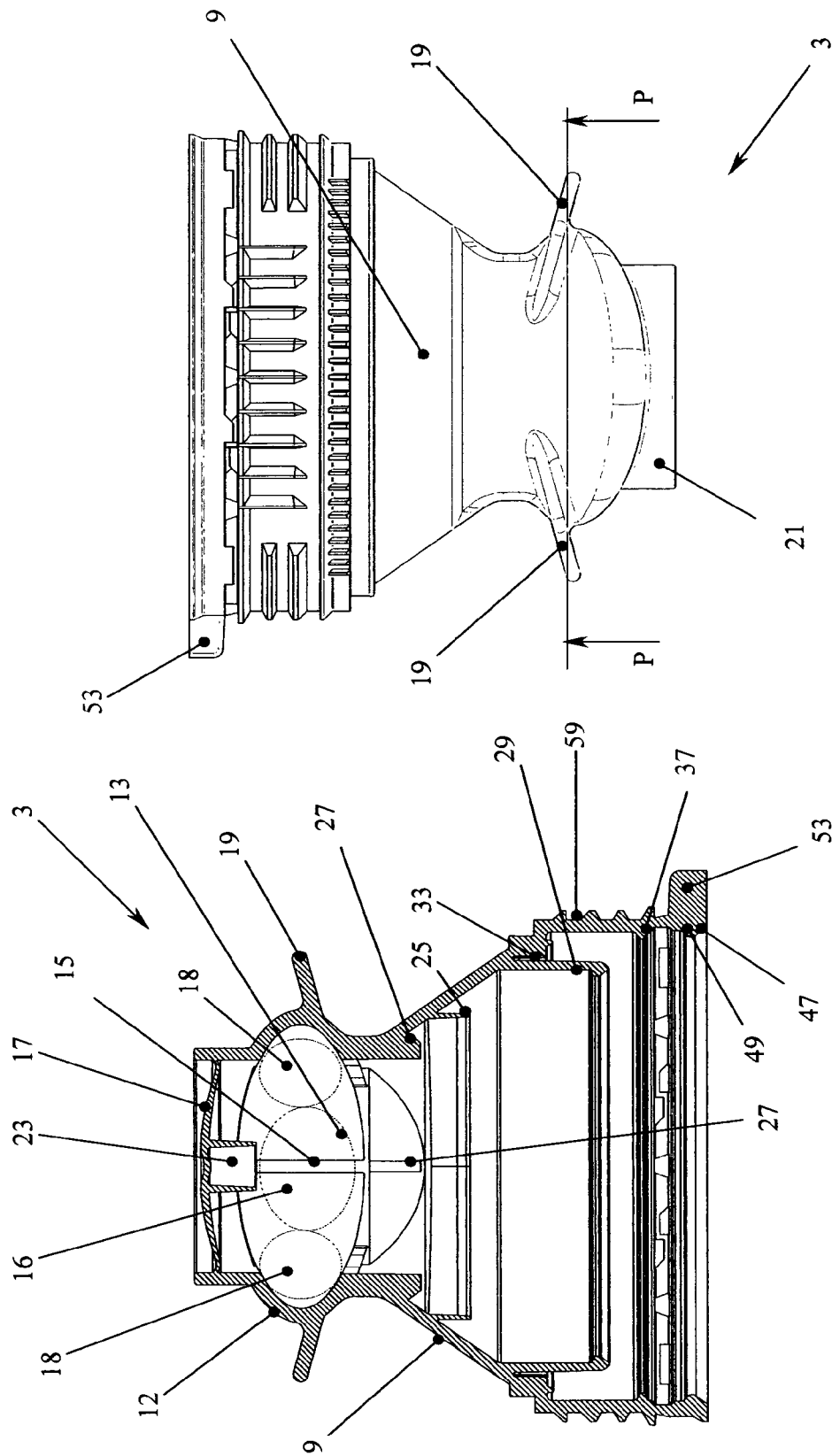

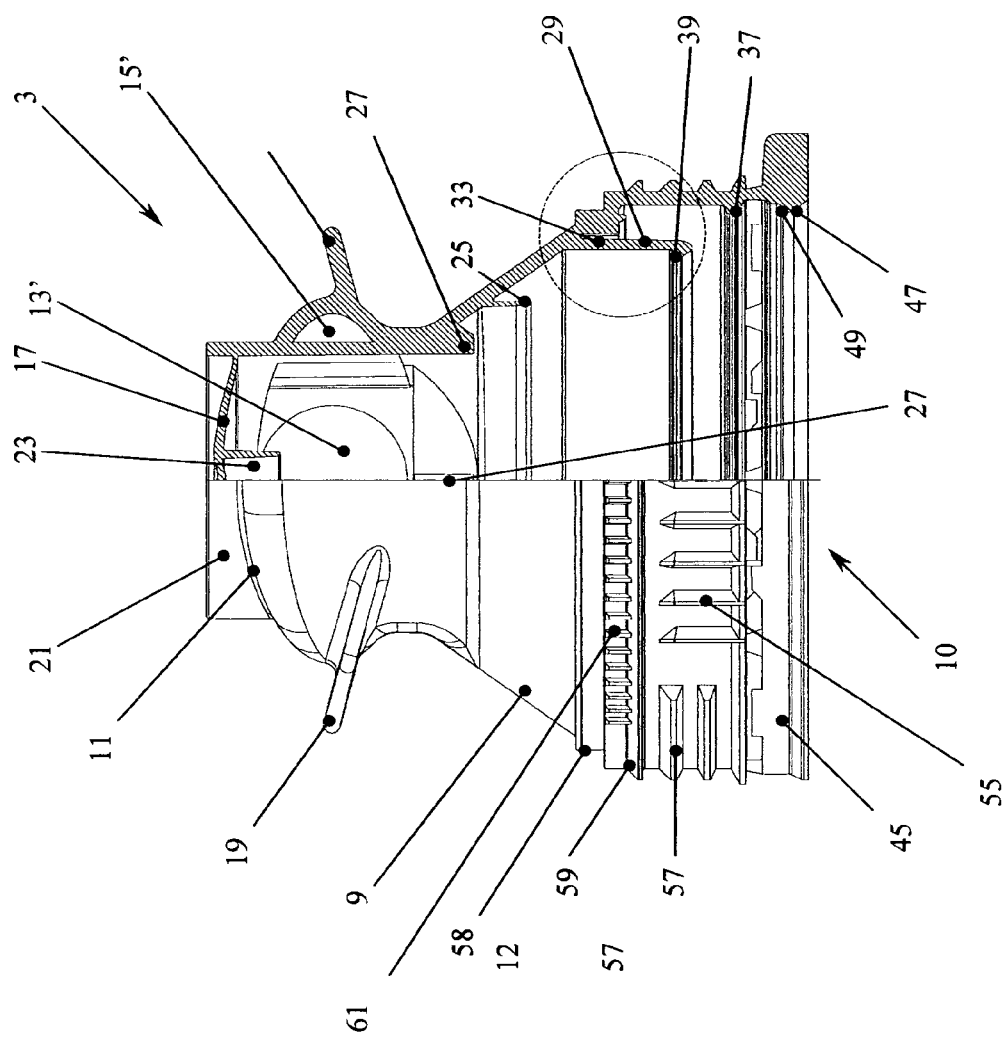

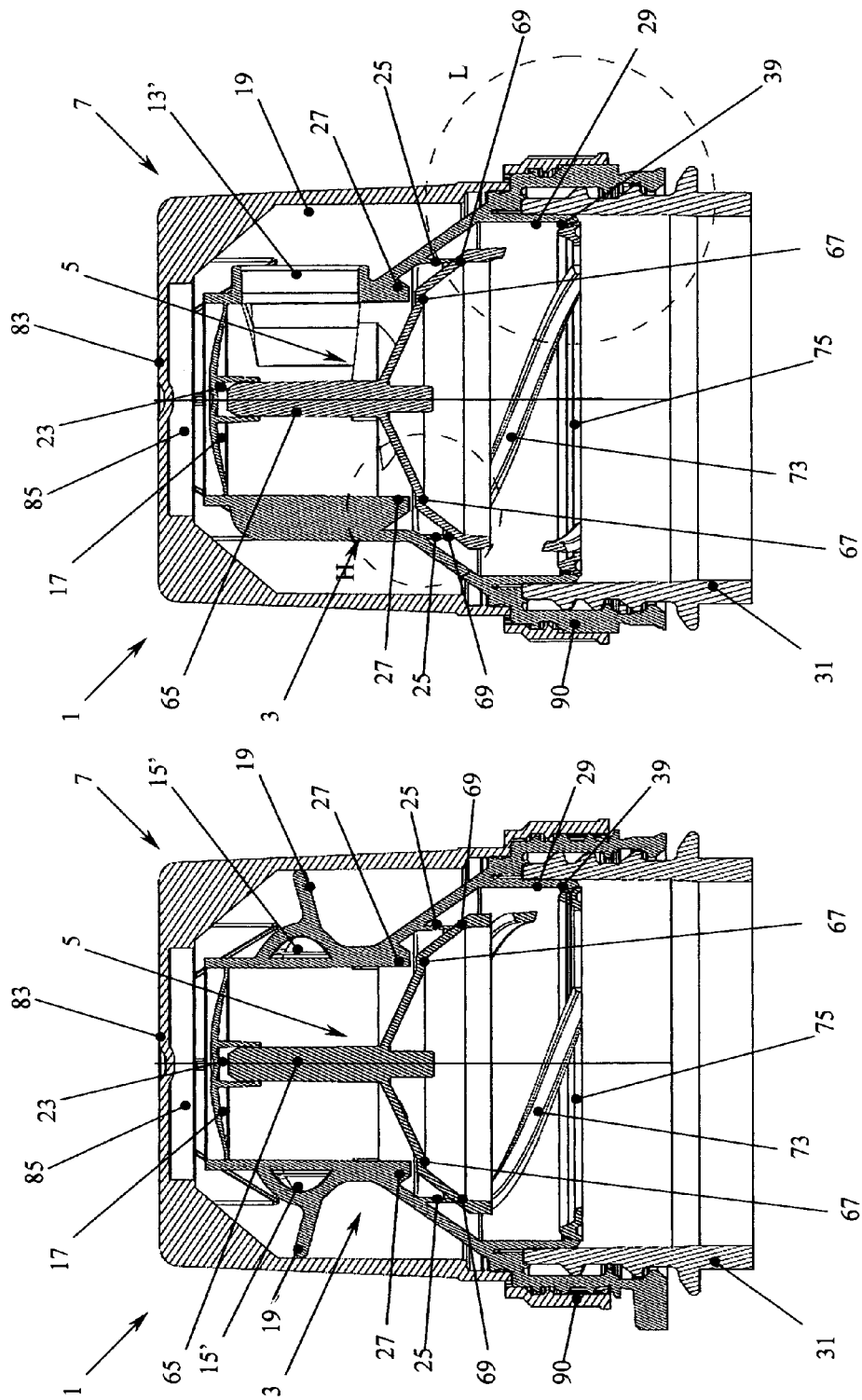

TAP WITH INTEGRAL AIR VENT FOR DELIVERING LIQUIDS FROM VESSELS

CROSS-REFERENCE TO RELATED APPLICATION

The present Application is a national stage of International Patent Application No. PCT/IT2009/000416, titled "Tap for Delivering Liquids from Vessels," filed Sep. 17, 2009, which claims priority from Italian Patent Application No. TO2009A000009 filed Jan. 9, 2009 and Italian Patent Application No. TO2008A000740 filed Oct. 9, 2008, the contents of which are incorporated in this disclosure by reference in their entirety

BACKGROUND INFORMATION

1. Field of the Invention

The present invention refers to a tap for delivering liquids from vessels, in particular vessels of the rigid type or of the so-called "bag-in-box" type. The following description will refer to the application of the inventive tap onto a rigid vessel, commonly used for containing water or similar liquids, but it is obvious that the inventive tap, with a small number of adaptations and the creation of a profile adapted to be placed on an engagement mouth for this type of taps, can be used also on "bag-in-box" vessels or other types of vessels.

2. Background of the Invention

In order to deliver water from rigid vessels, very few arrangements of taps are known in the art, all composed by a very high number of parts, some of which, due to their nature, are also very costly: the final result is a highly costly tap, that cannot be made in practice, since it heavily affects the final cost of the liquid-vessel-tap product, cost that is given by the steps of molding and assembling and the plastic material used for producing the different pieces composing the tap.

Known taps are costly because, in applications with rigid vessels, to avoid having to drill the vessel itself so that air enters therein while liquid goes out, the tap had to be equipped with at least one passage for air that can be actuated (namely opened and closed) together with the liquid-delivering passage. However, all existing taps provide that the two above-mentioned passages are placed one above the other with respect to the liquid-delivering axis and are divided by at least one wall that allows "creating" a division between liquid outlet and air inlet: this compels to provide the tap with a control member to be made in two pieces, to obtain seal and operation. The external control piece (namely a sort of dome-shaped elastic pushbutton), to be made separately from the control piston, is a very costly piece of plastic elastic material, since it must guarantee the necessary elasticity and pulling force to keep the closing valve member against the (preferably cone-shaped) sealing wall: therefore, in prior art delivering taps, a front pushbutton is adopted, constrained to the valve opening/closing stem that performs, at the same time, a carrier function. Alternatively, some known taps, to allow the passage of liquid to deliver and air and to guarantee the actual division between air chamber and liquid chamber, must be internally equipped with suitable divisions made by means of various walls and geometries, and more pieces that complicate and increase the final tap price/cost.

In addition to this, there are taps with air passages created with many parts that are opened by rotation (and not through squashing of an elastic membrane), and that have a seal of the cylindrical type, but they have many problems: for example, they have no automatic closure, namely their closure must be performed by the user, they have no warranty seal and moreover they must also be internally equipped with suitable divisions made by means of various walls and geometries and many pieces that complicate and increase the final tap price/cost.

Moreover, in known taps, the protection cover is usually lacking a warranty seal and is kept onto the tap by constraint: the tampering-preventing warranty is provided by a costly heat-shrinking film that winds cover and tap and ensure the seal between cover itself and tap.

Moreover, in known taps, the dome-shaped elastic pushbutton making the external control is an autonomous piece connected to the external tap body and also has carrier functions, being also constrained to the internal stem in order to operate as spring, due to its own properties of reversible elastic deformation to "pull" the stem to bring it back to its closing position, usually against a rigid cone-shaped profile created on the tap body: usually, in fact, the body of known taps is very rigid while the stem must be produced with a soft material. Moreover, prior art taps can be adapted only on bottle necks suitably created with particular geometries.

SUMMARY OF THE INVENTION

Object of the present invention is solving the above prior art problems, by providing a tap that is composed of a minimum number of pieces and therefore is of a low cost, making in practice the external control member in a single piece with the support body, manufactured in a single material and using traditional, non-complex moulding techniques, and exploiting the thickness and shape of various internal geometries to have, on the same body, rigid parts and soft and flexible parts.

Another object of the present invention is providing a tap as mentioned above that is equipped with a single delivering beak converging in a single chamber in which, when delivering liquid, a lower space for passing liquid and an upper space for passing air are naturally defined: this arrangement allows highly simplifying the final tap geometry and increasing its functionality, since the need is removed for providing the tap with additional, complex and costly internal partitions or divisions and/or costly pieces that allow absolutely certainly having a sharp division between air chamber and liquid chamber.

A further object of the present invention is providing a tap as mentioned above in which the front elastic pushbutton, though not having carrier functions, allows opening the tap due to the special curvature and the varying thickness of the membrane, that allows actuating the internal spring-type valve.

A further object of the present invention is providing a tap as mentioned above in which the dome-shaped elastic pushbutton performing the external control has no spring functions.

A further object of the present invention is providing a tap as mentioned above that is able to be installed on any type of vessel, independently from the torsion- or pressure-type positioning machines with which lines for plugging such vessels are currently equipped: such installation occurs without in any way damaging the internal structure or the external warranty seal of the inventive tap.

A further object of the present invention is providing a tap as mentioned above in which the protection cover cooperates with the tap body through anchoring and sealing means, also made in a single piece with the above body.

A further object of the present invention is providing a tap equipped with orienting and rotation-preventing means, adapted to allow a correct assembly of the protection cover onto the body.

A further object of the present invention is providing a tap equipped with means for preventing the cover protecting seal from getting oval.

A further object of the present invention is providing a tap equipped with a fastening/sealing geometry present on the body, cooperating with a geometry present on the cover to perform a waterproof seal between the two members and guarantee a maximum cleaning.

A further object of the present invention is providing a tap comprising a protecting cover equipped with a sealing ring operating as warranty seal as replacement of the prior art costly heat-shrinking films.

A further object of the present invention is providing a tap that is able to adapt itself to the most widespread bottle geometry on the market without requiring any modification.

The above and other objects and advantages of the invention, as will appear from the following description, are obtained with a delivering tap as claimed in claim 1. Preferred embodiments and non-trivial variations of the present invention are the subject matter of the dependent claims.

It will be immediately obvious that numerous variations and modifications (for example related to shape, sizes, arrangements and parts with equivalent functionality) can be made to what is described, without departing from the scope of the invention as appears from the enclosed claims.

BRIEF DESCRIPTION OF THE DRAWINGS

The present invention will be better described by some preferred embodiments thereof, provided as a non-limiting example, with reference to the enclosed drawings, in which:

FIG. 1 shows a perspective view of a first preferred embodiment of a component of the delivering tap according to the present invention;

FIG. 2 shows a partially-sectioned side view of the component of the delivering tap of FIG. 1;

FIG. 6 shows an enlarged view of the member pointed out in box B in FIG. 1;

FIG. 7 shows an enlarged view of the member pointed out in box C in FIG. 4;

FIG. 8 shows another perspective view of the component of the delivering tap of FIG. 1;

FIG. 9 shows an enlarged view of the member pointed out in box D in FIG. 8;

FIG. 10 shows a perspective view of a preferred embodiment of another component of the delivering tap according to the present invention;

FIG. 11 shows a top view of the component of the delivering tap of FIG. 10;

FIG. 12 shows a sectional view of the component of the delivering tap along section line E-E of FIG. 11;

FIG. 13 shows an enlarged view of the member pointed out in box F of FIG. 12;

FIG. 16 shows a top sectional view of a first preferred embodiment of the assembled delivering tap according to the present invention;

FIG. 17 shows a side sectional view of the assembled delivering tap of FIG. 16;

FIG. 20 shows a sectional view of the component of the delivering tap of FIG. 1;

FIG. 21 shows a top view of the component of the delivering tap of FIG. 1;

FIG. 25 shows a side partially-sectioned view of a second preferred embodiment of the component of the delivering tap according to the present invention;

FIG. 28 shows a top sectional view of a second preferred embodiment of the assembled delivering tap according to the present invention; and FIG. 29 shows a side sectional view of the assembled delivering tap of FIG. 28.

DETAILED DESCRIPTION OF PREFERRED EMBODIMENTS

Figure 4:
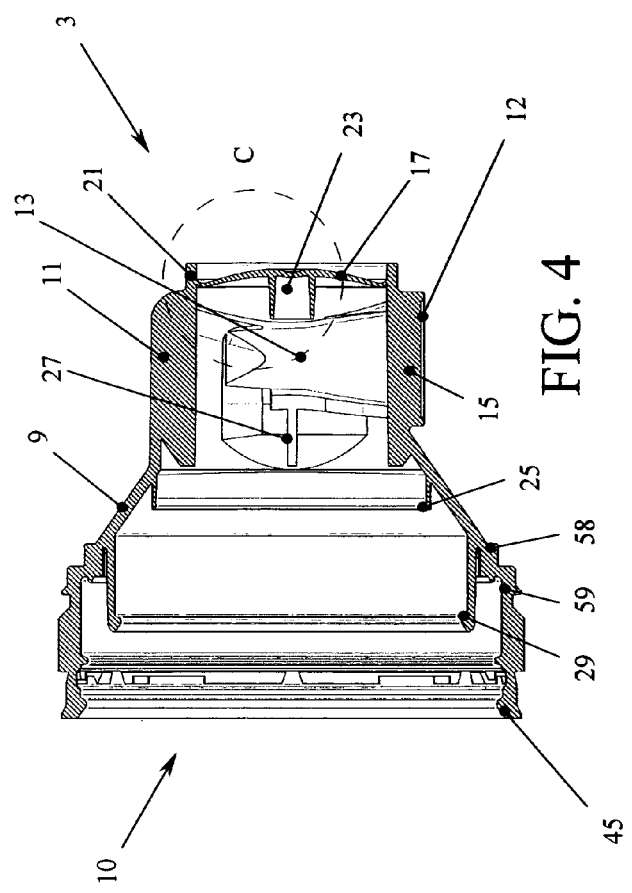
FIG. 4 shows a sectional view of the component of the delivering tap along section line A-A of FIG. 3.

With reference to the Figures, embodiments of the delivering tap 1 of the invention, which are non-limiting examples, are described. It will clearly appear to a skilled person in the art that the described tap, in addition to be able to be made with equivalent shapes, sizes and parts, could be used for various types of vessels, for example rigid ones, the so-called "bag-in-box" or others.

According to the first preferred embodiments shown in FIGS. 1 to 24, the tap 1 according to the invention (like the one, for example, shown in FIGS. 16 and 17) is used for delivering liquids from a vessel (of the rigid type or "bag-in-box" type, not shown), and is composed of at least one body 3 (like the one, for example, shown in FIGS. 1 to 9) made in a single piece and integral with at least one elastic thrusting pushbutton 17 and at least one sealing lip 25, both flexible, as will be described below, due to particular geometry and thickness, at least one valve member with integrated spring 5 (like the one, for example, shown in FIGS. 10 to 13) inside such body 3 and at least one protecting cover 7 (like the one, for example, shown in FIGS. 14 and 15).

In particular, the body 3 comprises a supporting member 9, having a first end equipped with at least one connecting neck 10 adapted to be connected to a manifold 31 of a vessel of a liquid to be delivered and a second opposite end from which a head 11 projects, equipped with at least one delivering beak 12 for delivering liquids communicating with a single internal chamber 13 adapted to allow that, due to its sizes and the cooperation between the internal front volumes of the delivering beak 12 and the internal rear volumes of the internal chamber 13, as will be described herein below in greater detail, when opening the tap 1 for delivering liquid, at least one lower space for passing liquid and at least one upper space for passing air are naturally defined, without the need of further divisions by means of various walls and geometries, or dedicated mouths. As can be noted from the Figures, the delivering beak 12 can be equipped, in a substantially central position, with at least one stiffening rib 15 whose function is merely structural.

The head 11 is further equipped at least with the elastic thrusting pushbutton 17, performing the external delivering control of the tap 1, therefore adapted to allow delivering liquids, and with winged actuating means 19, of the commonly-known type. Preferably, the head 11 comprises at least one protecting edge 21 of the elastic thrusting pushbutton 17 arranged projecting and on the perimeter of the pushbutton 17 itself, adapted to prevent an accidental pressure of the pushbutton 17 and the consequent undesired delivery of liquid from the tap 1.

In particular, the elastic thrusting pushbutton 17, commonly being shaped as a dome in cross section, is made as an elastic membrane obtained in a single piece with the body 3: such membrane is equipped with a particular geometry/shape, defined by exploiting the different sectional thickness in different points of the membrane and the special curved geometry, to allow a reversible deformation of the elastic thrusting pushbutton 17 that operates, as will be described below in greater detail, in order to translate the internal valve member 5 so that the delivery of liquid from the delivering beak 12 is allowed. In addition to the shown ones, obviously other geometries are possible for making the elastic thrusting pushbutton 17, which can improve its working efficiency.

In the tap 1 according to the present invention, the membrane is then made integrally with the body 3 of the tap 1 through traditional molding processes that allow obtaining the two characteristics of elasticity for the elastic thrusting pushbutton 17 and stiffness for the body 3, operating only on the geometries of the membrane.

The elastic thrusting pushbutton 17 is therefore suitable to be pushed towards the body 3 of the tap 1 (commonly by the pressure of a finger of a user's hand) to allow delivering liquid and adapted, when the delivery thrust ceases, to return to its initial rest position due to the reversible deformation and the elastic properties of the membrane.

Advantageously, however, contrary to what is taught by the prior art, the elastic thrusting pushbutton 17 is not constrained to any other member of the tap 1 and has no "spring" functions or anyway functions of a member capable of having "carrier" functions, apart from the one of allowing its reversible deformation: in particular, the elastic thrusting pushbutton 17 has not the function of an elastic member that "pulls" the valve member 5 with which it cooperates, as instead occurs in some known delivering taps.

With particular reference to FIG. 7, it is possible to note that, preferably, an internal surface of the elastic thrusting pushbutton 17 is equipped with at least one guiding cylinder 23 adapted, as will be described below, to guide the translation of the valve member 5 inside the body 3: advantageously, it can be noted that such valve member 5 is not constrained to the membrane of the elastic thrusting pushbutton 17, but is actually free, when opening, to enable an axial horizontal movement of the valve member 5 itself. Moreover, the guiding cylinder 23 can be useful, when assembling the tap 1 according to the present invention, to have a guarantee of a perfect "axial" assembling of the valve member 5 inside the body 3.

Internally, the body 3 is further equipped with the flexible sealing lip 25 cooperating with the valve member 5 to prevent the undesired leakage of liquid from the tap. Also in this case, the sealing lip 25 is obtained as a single piece with the body 3 and is equipped with a thin geometry that exploits the material resiliency, making the lip 25 still more flexible. Obviously, the sealing lip 25 can be made with different thickness and geometry to obtain different flexibility levels.

The body 3 is further internally equipped with an adequate number of abutment means 27 that, cooperating with a plane geometry obtained on the valve member 5, make stop means of the valve member 5 itself, in case of presence of pressure inside the vessel that tends to push the valve member 5 outwards: the presence of the abutment means 27 therefore will operate in order to block the valve member 5 within a certain position which will avoid itself to damage the sealing lip 25, by irreversibly deforming it (for example, making the lip 25 exceed its yielding point), inhibiting the seal of the tap 1 according to the present invention.

The body 3 is further internally equipped with at least one main sealing cylinder 29 on which the necessary geometries are obtained for performing the necessary seal with the vessel manifold 31 with which the tap 1 is coupled. Moreover, the main sealing cylinder 29 is equipped with necessary geometries to favor the insertion and the stable anchoring of the valve member 5 when assembling the tap 1.

Figure 5:
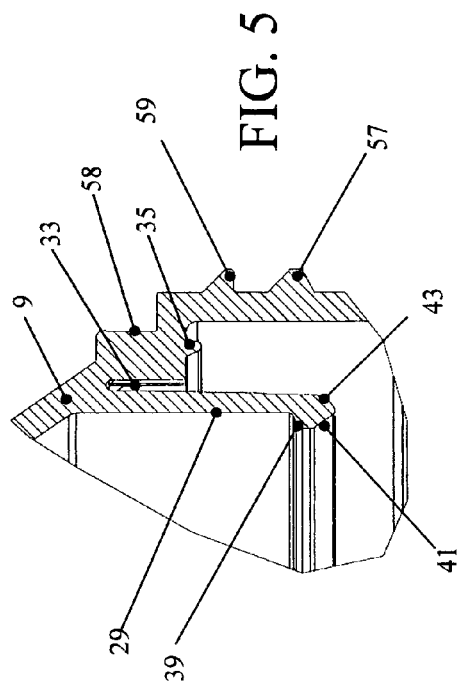
FIG. 5 shows an enlarged view of the member pointed out in box M in FIG. 2.

With particular reference to FIG. 5, it is possible to note that, on the perimeter and interposed with the supporting member 9, the main sealing cylinder 29 comprises at least one enlightening groove 33 adapted to make the main sealing cylinder 29 extremely flexible. The adoption of the enlightening groove 33 advantageously derives from the observation that the geometries of the manifold 31 neck cannot always be perfectly circular: in fact, after the various injection molding and blowing processes when manufacturing the manifolds 31, very often these latter ones remain oval. Consequently, in known delivering taps, this oval shape is transmitted to the body, to which the manifold is directly connected, in order to be then propagated to the whole tap, generating a lack of seals and consequent liquid leakages: in fact, as known, since the tap body is made in a single piece, it transmits the deformation up to the area in which the sealing lip is obtained, that, by being deformed, does not allow any more to perfectly adhere to the valve member 5. Therefore, due to the enlightening groove 33, the possible oval shape of the manifold 31 is compensated by the flexibility of the main sealing cylinder 29, avoiding its transmission to the rest of the body 3.

In order to further increase the seal between tap 1 and vessel manifold 31 and remove possible problems due to internal imperfections of the manifold itself, that would impair the liquid seal, the main sealing cylinder 29 can be surrounded by at least one abutment edge 35, preferably having a section shaped as a triangle, interposed between the enlightening groove 33 and the supporting member 9. Advantageously, in fact, the geometry obtained on the main sealing cylinder 29 performs the seal by interference inside the vessel manifold 31 while the abutment edge 35 performs the seal outside the manifold 31 itself, in order to compensate for possible abrasions or deformations being present inside the manifold 31 increasing the liquid seal.

The connecting neck 10, suitable for the connection of the body 3 with the manifold 31, is internally equipped with at least one first anchoring means 37, preferably made as circular rib or undercut, adapted to be anchored at the end of the possible thread externally present on the manifold 31, in such a way as to increase the seal/anchorage of the tap 1 on the vessel.

The lower edge of the main sealing cylinder 29 is internally equipped with at least one second anchoring means 39, also preferably made as circular rib or undercut, adapted to allow fastening, as will be described below, the valve member 5. Moreover, the same edge of the main sealing cylinder 29 can be equipped with at least one internal beveling 41 suitable to enable the insertion of the valve member 5 inside the body 3 and an external beveling or spoking 43 suitable to enable the insertion of the body 3 on the vessel manifold 31.

Obviously, in order to provide more safety against counterfeiting of the liquid inside the vessel, the body 3 is further equipped with at least one warranty or "tamper-evident" seal 45, of a substantially known type, adapted to prove its lack of tampering and comprising, inside it, the necessary geometries for the perfect anchoring of the tap 1 with a main undercut 47 and a suitable locking geometry 49.

Figure 3:
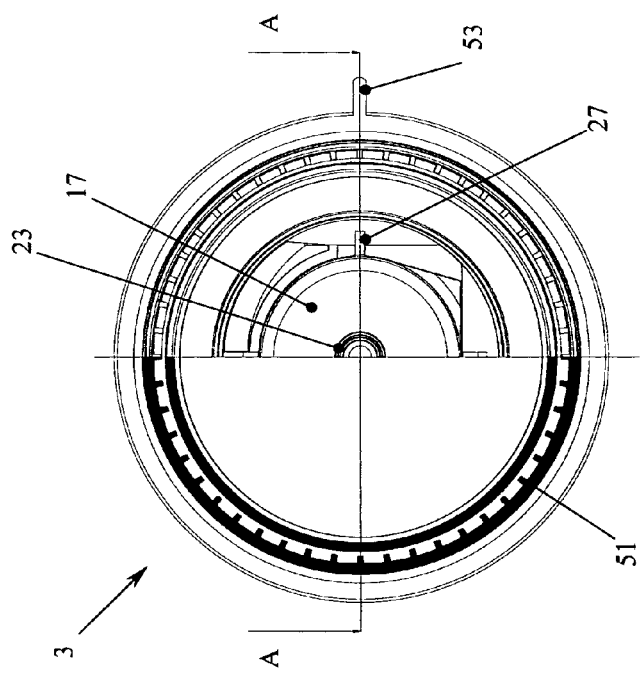
FIG. 3 shows a partially-sectioned top view of the component of the delivering tap of FIGS. 1 and 2.

With reference in particular to FIG. 3, it is possible to note that the body 3 can further comprise means for increasing the resistance to vertical loads. Such resistance-increasing means are preferably made as a plurality of small teeth 51, arranged in succession and circularly interposed between the enlightening groove 33 and the supporting member 9, suitable to reinforce the body 3 and increase its resistance to vertical loads, enabling its storing on a stack: without the resistance-increasing means, in fact, the tap 1 would collapse when storing, putting on pallets and transporting it.

Moreover, the body 3 can be externally equipped, preferably next to the connecting neck 10, with orienting means for assembling the tap 1 onto the vessel manifold 31: such means are preferably made as at least one tooth 53 that allows the correct orientation of the body 3 with respect to the manifold 31 and its regular assembly: in fact, usually, the body 3 is snap-assembled onto the manifold 31 and then, in order to position the body 3 in an oriented way, a reference is necessary, that is provided by the tooth 53.

Moreover, the body 3 can be externally equipped, preferably next to the connecting neck 10, with orienting/rotation-preventing means adapted to enable the correct assembly of the cover 7 onto the body 3 and, as will be described below, the engagement of a sealing ring of the cover 7: such means are preferably made as at least one first plurality of successive and parallel ribs 55 with special bit geometries suitable to allow their quicker and more accurate insertion in the ring geometries of the cover mentioned below.

Moreover, the body 3 can be externally equipped, preferably next to the connecting neck 10, with means for preventing the sealing ring of the cover 7 from getting oval, adapted to avoid that the sealing ring, once assembled, gets removed due to the oval shape of the cover 7: such means are then preferably made as at least one second plurality of successive ribs 57, parallel and orthogonal to the first plurality of ribs 55 that in practice provide an orthogonal abutment, complementary to the one provided by the first plurality of ribs 55.

In fact, where there are the ribs 55, 57, the sealing ring cannot be deformed: instead, when there are no abutments that prevent from getting oval, the ring would be deformed and therefore would be extracted from the body together with the cover, impairing the ring function that, once assembled on the body, is remaining anchored to the cover operating as "tamper-evident", while the upper protecting cover can be removed by breaking the teeth connecting the two geometries between ring and cover that are made in a single piece.

Moreover, the body 3 can be externally equipped, preferably next to the connecting neck 10, with at least one anchoring rib 59 of the protecting cover 7.

Moreover, the body 3 can be externally equipped, preferably next to the connecting neck 10, with a plurality of rotation-preventing teeth 61 adapted to avoid, also cooperating with the orienting/rotation-preventing means, that the cover 7 can freely rotate once assembled on the body 3.

As mentioned, the tap 1 further comprises at least one valve member 3 contained in the body 3 and adapted to open/close the communication between the connecting neck 10 and the vessel; moreover, the valve member 5 is adapted to cooperate at least with the elastic thrusting pushbutton 17 to open and close the liquid-delivering opening.

In the embodiment shown in FIGS. 10 to 13, the valve member 5 is composed of a body 63 which is substantially cone-shaped or with double cone shape separated by a horizontal plane from whose vertex an elongated stem 65 departs, suitable to cooperate with the elastic thrusting pushbutton 17 next to the guiding cylinder 23, and made, as can be better seen in FIG. 10, with a geometry with a cross-shaped section, to reduce its weight. Advantageously, the elongated stem 65 communicates, without constraints, the valve member 5 with the elastic thrusting pushbutton 17.

The body 63 of the valve member 5 is further equipped on its surface, at the opposite end with respect to the one from which the stem 65 departs, with an abutment plane 67 adapted to cooperate with the abutment means 27 present inside the body 3 to avoid that, in case of an excessive pressure inside the vessel, the valve member 5 damages, due to an excessive advancement, the sealing lip 25.

From the abutment plane 67, the body 63 of the valve member 5 then goes on with at least one sealing cone 69 that performs the main sealing on the body 3 of the tap 1 getting in contact with the sealing lip 25: such sealing cone 69 then simultaneously closes the air passage and the liquid passage when the elastic thrusting pushbutton 17 is in its rest position.

From the sealing cone 69, the body 63 of the valve member 5 then goes on with a cylindrical portion 71 to which elastic means 73 are connected, adapted to provide to the valve member 5 a thrust in order to keep the tap 1 closed when there is no delivery, by pushing, in particular, the sealing cone 69 against the sealing lip 25. In particular, such elastic means 73 are composed of a helical spring, which can be made in a single body with the valve member 5 and is made of the same material of which the valve member 5 is made. FIGS. 10 and 12 better show the spiral-shaped geometry of the spring that makes the elastic means 73, commonly made of sturdy elastic plastic material. Such spring allows a lot of ductility as regards the closing force to be applied to the system, since it is enough to slightly change geometry and sectional thickness of the spring to obtain a greater or smaller closing force.

It is also possible, and preferable, to make the elastic means 73 of the same material of which body 3 and protecting cover 7 are made, in order to take into account the simplification of possible problems related to recycling of plastic materials. Advantageously, the function of the cylindrical portion 71 is stiffening the elastic means and avoiding that the connection of the turns of the elastic means 73 generates "shrinkages" next to the attachments of the turns that can be generated when cooling the plastic piece after its molding, generating a surface that is not perfectly "smooth" but with valleys: the cylindrical portion 71 therefore allows spacing the turns attachment from the sealing cone 69 moving the shrinkage phenomenon, generated as known by a bundle of plastic material or on the connection of many geometries in a single point, far from the sealing cone that, in order to perform a seal against liquids when coupled with the flexible body lip, must be geometrically perfect without imperfections on the surface.

The elastic means 73 then terminate with third anchoring means to the body 3, and in particular with at least one anchoring ring 75 of the valve 5 to the second anchoring means 39 of the main sealing cylinder 29. With particular reference to FIG. 13, it can be noted that, to enable assembling the valve member 5 inside the body 3, the anchoring ring 75 is equipped on its perimeter and externally with at least one curved profile 77. Similarly, to increase the sealing of the anchoring ring 75 inside the second anchoring means 39 of the main sealing cylinder 29, the anchoring ring 75 is equipped on its perimeter and externally with at least one sharp profile 79 adapted to perform a sort of "spike" effect on the geometry of the circular rib or undercut that makes the second anchoring means 39.

With particular reference to FIGS. 11 and 12, it is possible to note that, internally and axially, the body 63 of the valve member 5 is equipped with at least one centering pin 81 suitable to simplify the assembling step, by keeping the valve member 5 in a vertical position.

Figure 22:
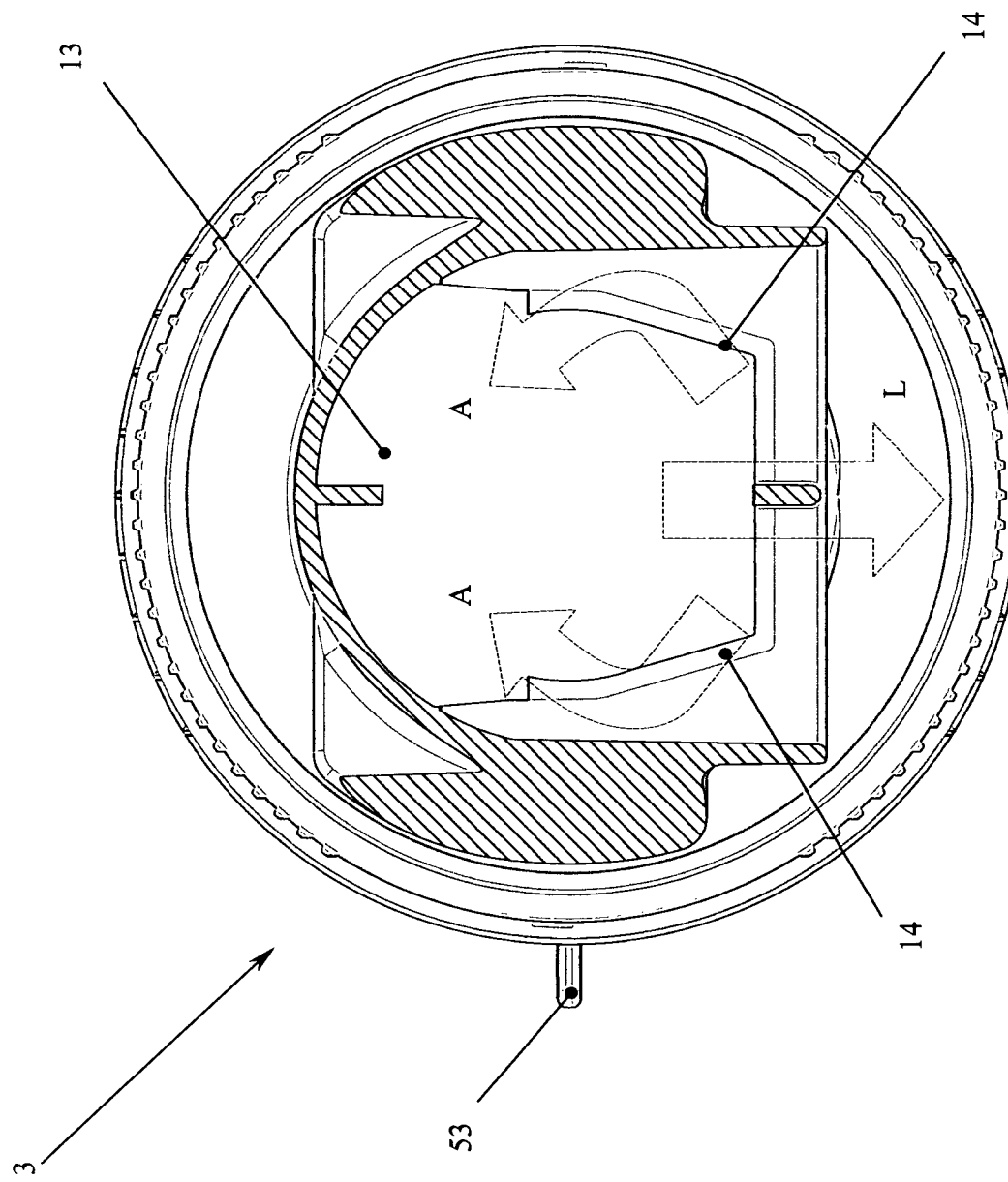
FIG. 22 shows a sectional view of the component of the delivering tap along section line P-P of FIG. 21.
Figures 23, 24:
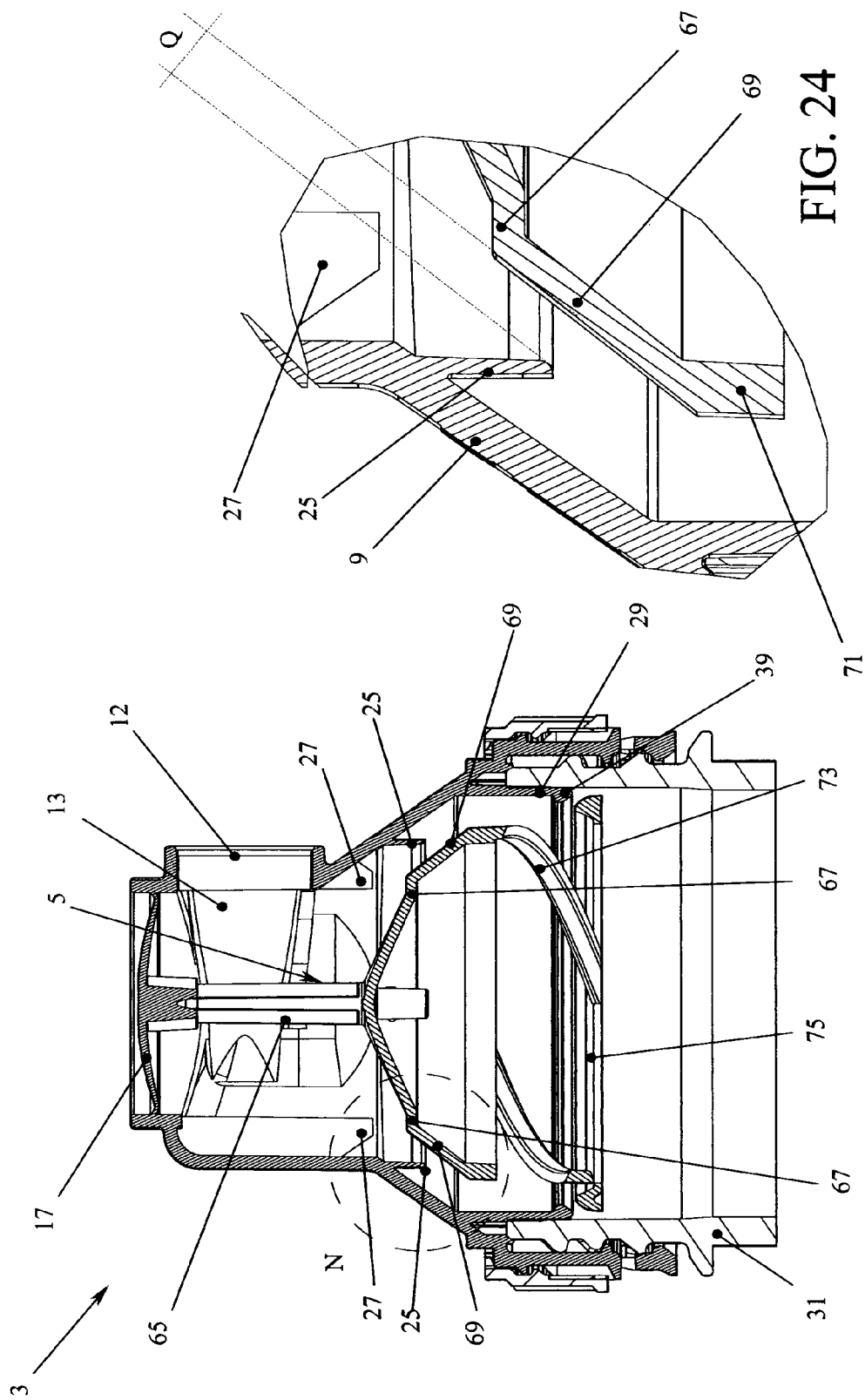
FIG. 23 shows another side sectional view of the component of the delivering tap of FIG. 1.
FIG. 24 shows an enlarged view of the member pointed out in box N of FIG. 23.
Figure 27:
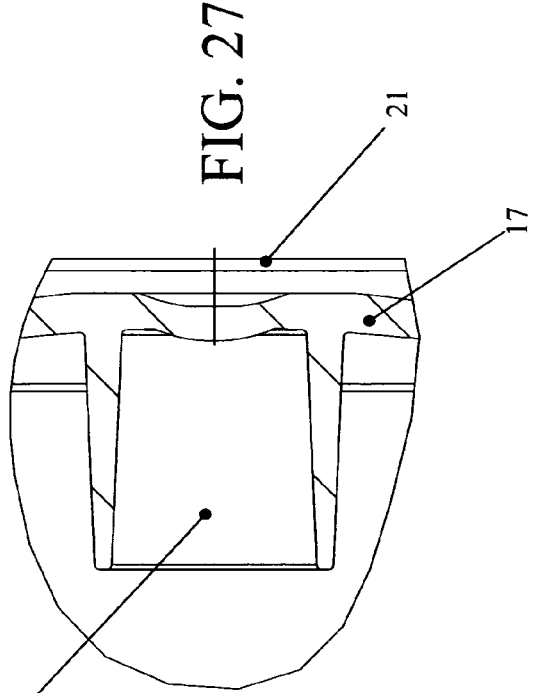
FIG. 27 shows an enlarged view of the member pointed out in box C of FIG. 26.
Figure 26:
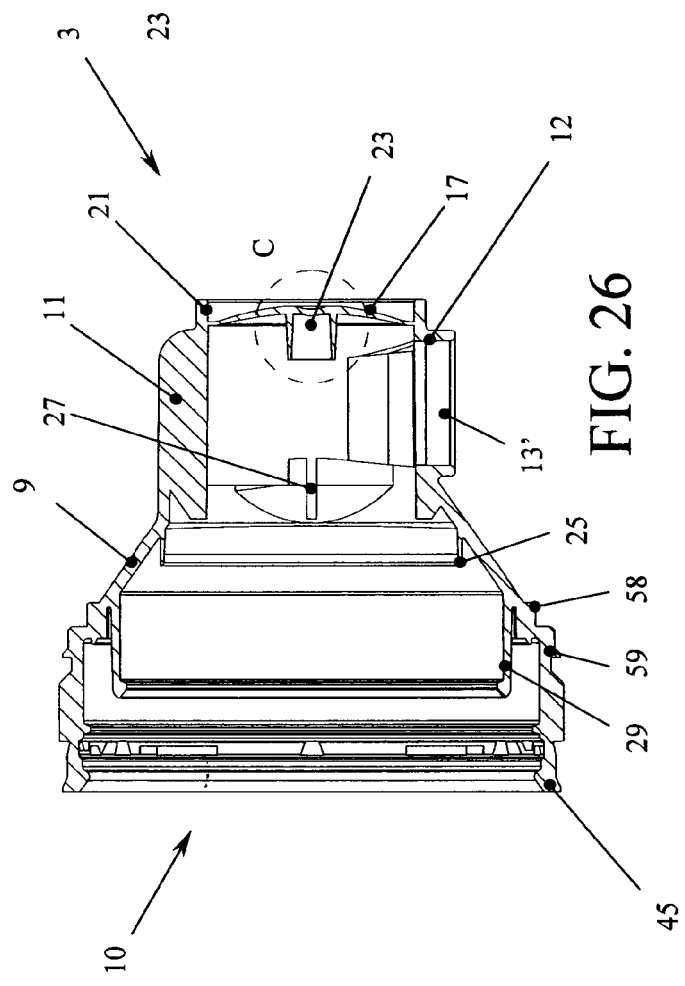
FIG. 26 shows a sectional view of the component of the delivering tap of FIG. 25.

With particular reference to FIGS. 20 to 24, it is possible to note the modes with which, when opening the tap 1 for delivering liquid, naturally in the single internal chamber 13, at least one lower space for passing liquid and at least one upper space for passing air, are defined: with particular reference to FIGS. 20 and 22, it is possible to note that the internal chamber 13 is equipped with at least one internal guiding profile 14 converging downwards to move the flow L of liquid going out towards at least one central space portion 16 of the delivering beak 12: laterally to such central portion 16, the delivering beak 12 is further advantageously equipped with at least two lateral space portions 18 for entering the air flow A inside the chamber 13. In order to better enable the creation and separation between incoming air flow A and outgoing liquid flow L, respectively passing through the central portion 16 and the lateral portions 18, the delivering beak 12 is preferably shaped as an ellipse in its section: in fact, the Applicant has experimentally verified that such elliptical shape is optimum to guarantee that the lateral portions 18 are always kept free from the liquid flow L, allowing the incoming air flows A to create a path naturally through the two lateral portions 18 of the delivering beak 12. Obviously, the delivering beak 12 can be made in any other shape without departing from the scope of the present invention. With reference then, in particular, to FIGS. 23 and 24, it is possible to note that, during the step of opening the tap 1 for delivering liquid, namely when the elastic thrusting pushbutton 17 is pressed and consequently the internal valve member 5 is pushed in its opening position, the sealing cone 69 of the internal valve member 5 is detached from the sealing lip 25 by a certain distance Q (as shown, for example, in FIG. 24). The flow of liquid L, passing then through such distance Q being created between the sealing cone 69 and the sealing lip 25, tends to follow the contour of the external surface of the internal valve member 5: as can be noted in particular from FIG. 23, advantageously the incidence angle of the outgoing liquid flow with the external surface of the internal valve member 5 is not excessively high, consequently allowing the outgoing liquid flow to follow the external profile of the internal valve member 5, leaving free the upper area of the body 3 interior, naturally creating the necessary upper space to enter air inside the rigid vessel during the delivery step.

Figure 15:
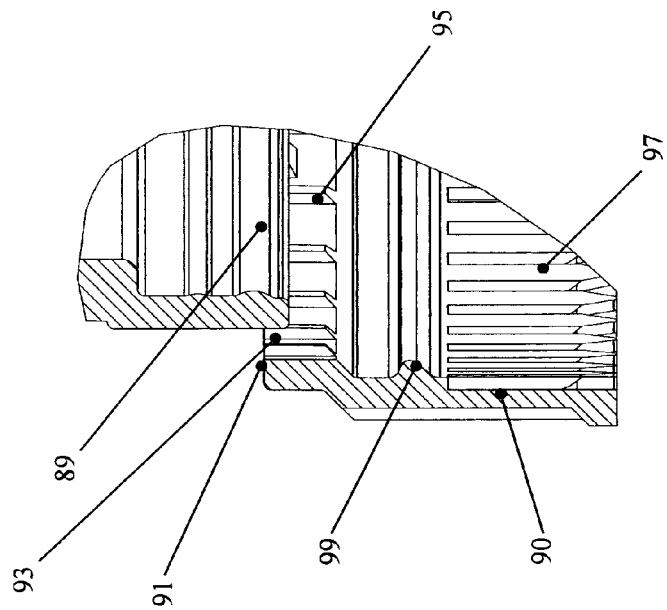
FIG. 15 shows an enlarged view of the member pointed out in box G in FIG. 14.
Figure 14:
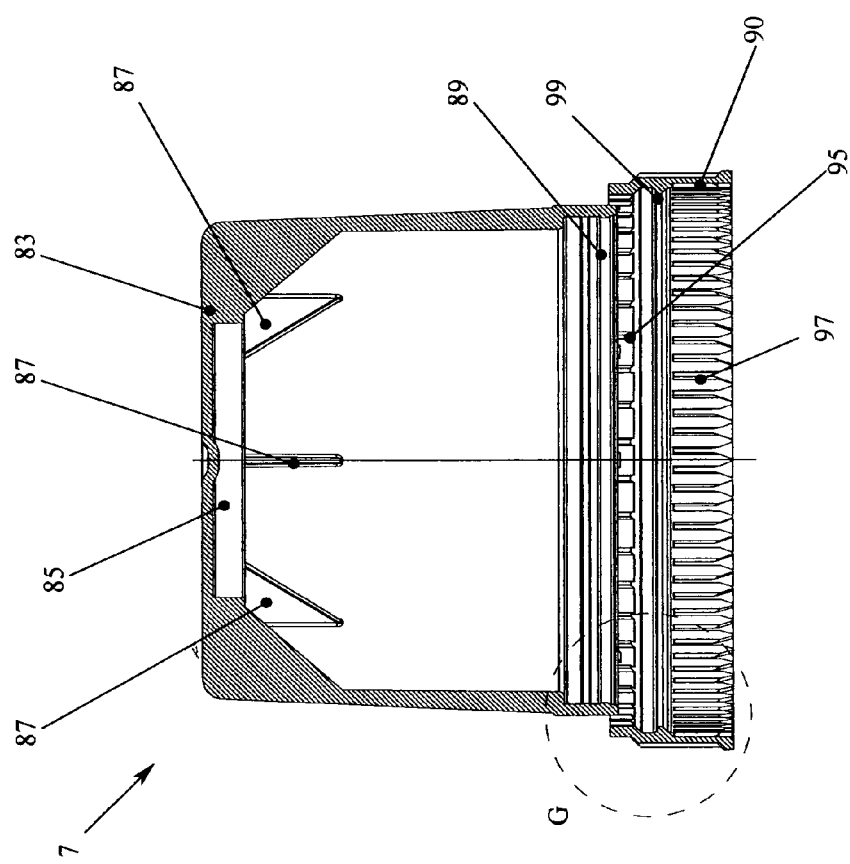
FIG. 14 shows a side sectional view of a preferred embodiment of another component of the delivering tap according to the present invention.

With reference in particular to FIGS. 14 and 15, it is possible to note that the protecting cover 7 is equipped, externally and on its top part, with at least one plane surface 83 that allows the bearing when stacking, during the storage and transport steps. Internally, the protecting cover 7 is further equipped with:

at least one internal cylindrical portion 85 adapted to allow the connection of a plurality of reinforcing ribs 87 aimed to increase the vertical resistance of the cover 7;

a sealing portion 89 adapted to be coupled by interference with the external geometry 58 of the body 3 and to perform a water-proof sealing, allowing, at the same time, to remove and put back the protecting cover 7 from/on the body 3 every time this is necessary to allow delivering the liquid;

at least one sealing ring 90 of the cover 7 to the body 3 functioning as "tamper-evident";

at least one plane connecting portion 91 between the sealing ring 90 and the cover 7, such connection being performed through a plurality of jumpers 93: advantageously, the plane connecting portion 91 gives a contribution for absorbing the assembling thrust of the cover 7 on the body 3; the breakage of the jumpers 93 obviously allows removing the protecting cover 7 from the body 3 to allow using the tap 1 and delivering the liquid;

a plurality of rotation-preventing teeth 95 arranged inside the sealing ring 90 adapted to cooperate with the corresponding rotation-preventing teeth 61 of the body 3 to prevent the cover 7 and the sealing ring 90 from rotating around the body 3;

a plurality of bit-shaped sectors 97 arranged inside the sealing ring 90 adapted to cooperate with the corresponding first plurality of ribs 55 of the body 3 to enable a correct insertion of the cover 7 on the body 3 and for preventing the cover 7 and the sealing ring 90 from rotating around the body 3;

at least one fastening circular rib or undercut 99 arranged inside the sealing ring 90 adapted to cooperate with the anchoring rib 59 of the body 3 to fasten the cover 7 to the body 3.

With reference now to FIGS. 16, 17, 18 and 19, it is possible to note the tap 1 according to the present invention in which the body 3, the valve member 5 and the cover 7 are completely assembled.

Then, once the valve member 5 is correctly inserted inside the body 3, with the anchoring ring 75 interfering with the circular rib or undercut that makes the second anchoring means 39 of the body 3, the elastic means 73 push the sealing cone 69 against the sealing lip 25: advantageously, the sharp profile 79 of the anchoring ring 75 creates a seat on the second anchoring means 39 of the body 3 and the anchorage increases upon increasing the interference that occurs when the tap is inserted into the manifold 31 that further tightens the circular rib or undercut that makes the second anchoring means 39 around the anchoring ring 75 of the valve member 5.

In the tap 1 according to the present invention the valve member 5 is then anchored to the body 3 and not to the elastic thrusting pushbutton 17: therefore, contrary to what is proposed by the prior art, the elastic thrusting pushbutton 17, that in known taps is a piece apart, is not the spring that pulls the valve stem against a chute, but it is not constrained to the valve member 5.

Obviously, the insertion of the valve member 5 inside the body 3 is enabled both by the geometry of the sealing cone 69 and by the internal beveling 41 of the edge of the main sealing cylinder 29.

Figure 18:
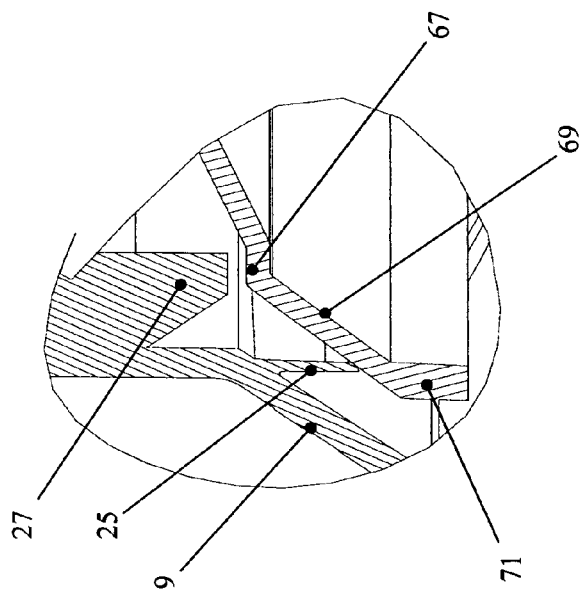
FIG. 18 shows an enlarged view of the member pointed out in box H of FIG. 17.

With reference in particular to FIG. 18, it is possible to note the sealing area between the sealing lip 25 and the sealing cone 69 of the valve member 5; moreover, the safety distance can be noted, kept between the abutment plane 67 and the abutment means 27. The safety distance is therefore the maximum stroke allowed to the valve member 5 in case of internal pressures of the rigid vessel: in fact, should the abutment plane 67 and the abutment means 27 be absent, the valve member 5, pushed by the rear pressure, would damage the sealing lip 25 without remedy.

Figure 19:
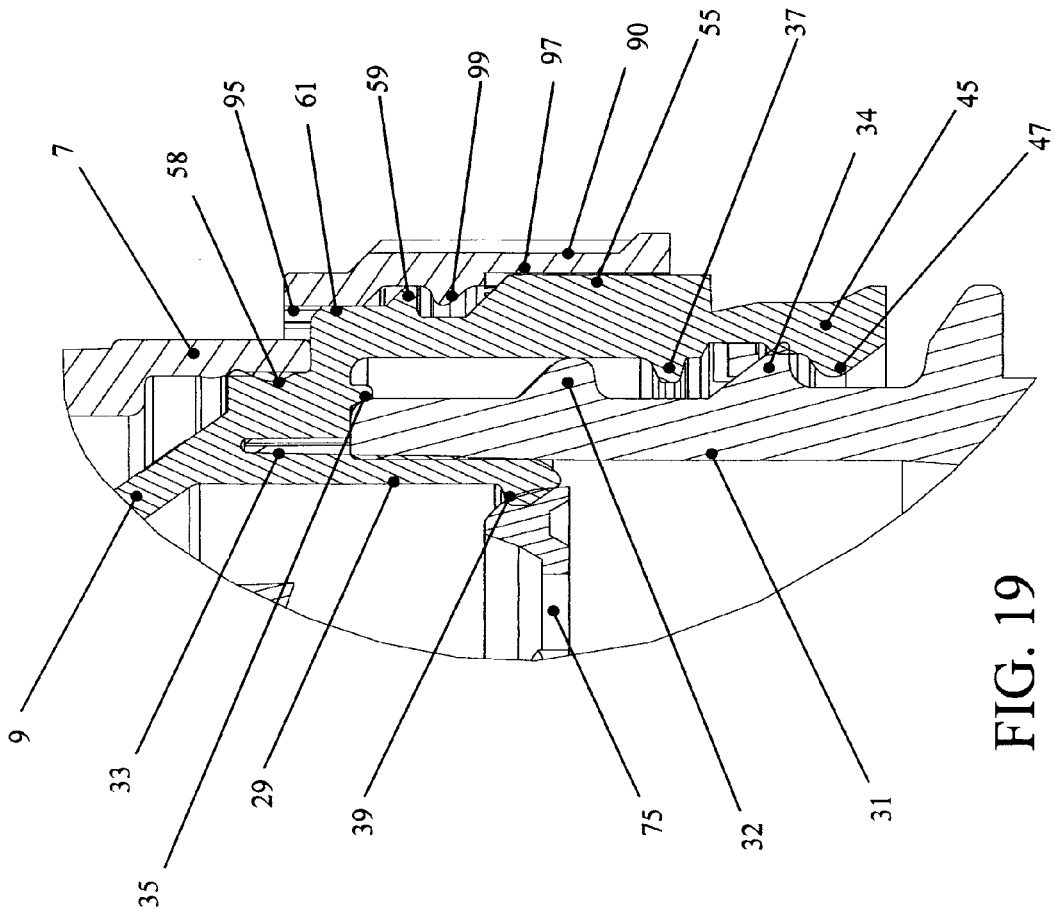
FIG. 19 shows an enlarged view of the member pointed out in box L of FIG. 17.

With reference instead to FIG. 19, it is possible to note the seals and the various connections between the protecting cover 7 and the body 3 and between the body 3 and the vessel manifold 31; in particular:

the cover 7 and its related sealing ring 90 (that initially are a single piece) are kept coupled with the body 3 through the respective fastening circular rib or undercut 99 with the anchoring rib 59 and the rotation-preventing teeth 95 and the bit-shaped sectors 97 with the corresponding rotation-preventing teeth 61 and the first plurality of ribs 55 of the body 3;

the body 3 is connected to the vessel manifold 31 through the circular rib or undercut making the first anchoring means 37 cooperating with the thread 32 externally present on the manifold 31 and through the main undercut 47 of the "tamper evident" 45 cooperating with a related rib 34, also externally present on the manifold 31: the sealing between manifold 31 and main sealing cylinder 29 of the body 3 is guaranteed by the abutment edge 35 interfering with the ends of the manifold 31 itself. It can be noted that the external geometries of the manifold 31 are standard, therefore, advantageously, the tap 1 according to the present invention is adapted for the most common vessel on the market without requiring any modification.

Moreover, advantageously, before removing the protecting cover 7 from the body 3, the winged actuating means 19 operate as further lateral stiffening of the tap 1 structure, by going in abutment onto the internal side walls of the cover 7 itself.

When the tap 1 is actuated for delivering by pressing the elastic thrusting pushbutton 17 overcoming the thrust force of the valve member 5, the membrane will allow, by means of its reversible deformation, the axial movement of the stem 65, that will discharge the opening force exerted by the user onto the circular rib or undercut that makes the second anchoring means 39 to which the valve member 5 is constrained, and the sealing cone 69 will be detached from the sealing lip 25 allowing the passage of liquid.

The single big chamber 13 of the tap 1 communicating with the delivering beak 12 will enable the liquid to naturally create the two necessary spaces for air to enter and liquid to go out: in particular, on the upper part, a space is naturally created for entering air, and on the lower part a space is created for making liquid go out, without the need of artificially creating two chambers by means of dividing walls.

Closing of the tap can then be performed, once having ceased the pressure on the elastic thrusting pushbutton 17, only with the return force of the elastic means 73, elastically loaded by the pressure exerted on the pushbutton 17, taking the sealing cone 69 back against the sealing lip 25.

In order to allow making at best all the above-mentioned inventive characteristics, the inventive tap 1 is preferably made of plastic material. Moreover, for its construction, in addition to the traditional application on rigid vessels, in particular suitable for containing water, the inventive tap 1 can find immediate application also for a vessel of the "bag-in-box" type, in which the tap 1, according to applications, is placed in a vertical or horizontal position with respect to the main vessel axis. Engineering arrangements suitable to perform such horizontal or vertical placement on vessels of this type will be immediately obvious to the skilled people in the art, after having read the present document.

According to a second preferred embodiment of the invention, shown in FIGS. 25 to 29, the delivering tap 1 according to the invention provides that the delivering beak 12 is internally divided into at least one mouth 13' for delivering liquids and into at least one mouth 15' for entering air into the container, these mouths 13', 15' making a series of integrated passages in the body 3 converging into a single air entry chamber in which, when delivering, a lower space for passing liquid and an upper space for passing air are naturally defined.

In a particularly preferred variation of the second embodiment, the air-entering mouths 15' are two and are arranged laterally with respect to the liquid delivering mouth 13'.

Moreover, the delivering tap 1 can comprise at least one protecting cover 7 for the body 3; this protecting cover 7 can be internally equipped with a sealing portion 89 adapted to be coupled by interference with an external geometry 58 of the body 3, or can be equipped with at least one sealing ring 90 to the body 3.

The invention claimed is:

1. A delivering tap for delivering liquids from a container, the delivering tap comprising at least one body made in a single piece and integral with at least one elastic, flexible thrusting pushbutton and at least one flexible sealing lip, and at least one valve member inside the body to allow a delivery of liquids when the pushbutton is pressed, the body comprising at least one head equipped with at least one delivering beak for delivering liquids and for entering air inside the tap, wherein:
   a) the delivering beak has no partitions for separating liquids from air;
   b) the delivering beak communicates with one and only one internal chamber of the body;
   c) the internal chamber is equipped with at least one internal guiding profile converging downwards in order to channel a flow of outgoing liquid towards at least one central space portion of the delivering beak, the delivering beak being further shaped as to provide at least two side space portions as inlet of a flow of air inside the chamber;
   d) during the delivery of liquid, the central space portion and the at least two side space portions are respectively created by the flow of liquid being delivered and by the flow of air correspondingly entering into the tap; and
   e) the flexible sealing lip cooperates with the valve member, the sealing lip being made in a single piece with the body.

2. The delivering tap of claim 1, wherein the delivering beak has an elliptical sectional shape.

3. The delivering tap of claim 1, wherein the head is equipped with the elastic thrusting pushbutton for realizing an external delivering control through wing-shaped actuating means the elastic thrusting pushbutton being a membrane equipped with a reversible elastic distortion and made in a single piece with the body, the elastic thrusting pushbutton not being constrained to the valve member.

4. The delivering tap of claim 1, wherein the body is internally equipped with a means for abutting cooperating with the valve member in order not to damage the sealing lip, and the body is externally equipped with orienting means for assembling the tap onto the container.

5. The delivering tap of claim 1, wherein the body is internally equipped with at least one main sealing cylinder for creating a seal with a vessel manifold with which the tap is coupled, the main sealing cylinder being equipped on a perimeter with at least one weight-reducing groove adapted to make the main sealing cylinder flexible, the main sealing cylinder being surrounded by at least one abutment edge, the main sealing cylinder creating a seal by interference inside the vessel manifold while the abutment edge creates the seal outside the manifold, a lower edge of the main sealing cylinder being internally equipped with at least one anchoring means of the valve member.

6. The delivering tap of claim 5, wherein the body is equipped with means for increasing resistance to vertical loads, the means for increasing the resistance to vertical loads comprising a plurality of small teeth arranged in succession and circularly interposed between the weight-reducing groove and a supporting member of the body.

7. The delivering tap of claim 1, wherein the valve member comprises a body which is substantially cone-shaped or with double conicity and plane, from whose vertex an elongated stem departs, adapted to cooperate with the elastic thrusting pushbutton next to a driving cylinder, the body which is substantially cone-shaped or with double conicity and plane being equipped on a surface with an abutment plane adapted to cooperate with a means for abutting, the valve member comprising at least one sealing cone that is adapted to perform a main sealing onto the body getting in contact with the sealing lip, the valve member comprising at least one cylindrical portion connected to a helical spring, the helical spring being connected by an anchoring means to the body, the anchoring means being at least one anchoring ring of the valve to a anchoring means of the main sealing cylinder, the anchoring ring being equipped on a perimeter and externally with at least one curved profile or with at least one sharp profile.

8. The delivering tap of claim 1, the tap comprising at least one protecting cover for the body.

9. The delivering tap of claim 8, wherein the protecting cover is internally equipped with a sealing portion adapted to be coupled by interference with the body.

10. The delivering tap of claim 8, wherein the protecting cover is equipped with at least one sealing ring to the body.

11. A delivering tap for delivering liquids from a container, the delivering tap comprising at least one body made in a single piece and integral with at least one elastic, flexible thrusting pushbutton and at least one flexible sealing lip, and at least one valve member inside the body to allow a delivery of liquids when the pushbutton is pressed, the body comprising at least one head equipped with at least one delivering beak for delivering liquids and for entering air inside the tap, wherein:

a) the delivering beak is internally divided into at least one mouth for delivering liquids and into at least one mouth for entering air into the container:

b) the delivering beak communicates with one and only one internal chamber of the body;

c) the internal chamber is equipped with at least one internal guiding profile converging downwards in order to channel a flow of outgoing liquid towards at least one central space portion of the delivering beak, the delivering beak being further shaped as to provide at least two side space portions as inlet of a flow of air inside the chamber;

d) during the delivery of liquid, the central space portion and the at least two side space portions are respectively created by the flow of liquid being delivered and by the flow of air correspondingly entering into the tap; and e) the flexible sealing lip cooperates with the valve member, the sealing lip being made in a single piece with the body.

12. The delivering tap of claim 11, wherein the air-entering mouths are two and are arranged laterally with respect to the liquid-delivering mouth.

\* \* \* \* \*